United States Patent [19]
Turner

[11] Patent Number: 5,842,308
[45] Date of Patent: Dec. 1, 1998

[54] PLANT WATERING DEVICE

[76] Inventor: Gregory N. Turner, 19 Everitts Hill Rd., Flemington, N.J. 08822

[21] Appl. No.: 723,678

[22] Filed: Sep. 30, 1996

[51] Int. Cl.$^6$ .................................................. A01G 25/00
[52] U.S. Cl. .................................... 47/48.5; 52/15; 52/16
[58] Field of Search .................................. 52/11, 12, 15, 52/16; 47/48.5, 66.6; 137/358

[56] References Cited

U.S. PATENT DOCUMENTS

| | | |
|---|---|---|
| 633,984 | 10/1899 | Blocher . |
| 1,063,395 | 6/1913 | Scribner . |
| 1,553,426 | 9/1925 | Altenbern et al. ...................... 52/15 X |
| 3,626,439 | 12/1971 | Kneisel . |
| 3,664,071 | 5/1972 | Gallagher ..................................... 52/15 |
| 4,800,675 | 1/1989 | Feil et al. . |
| 5,062,239 | 11/1991 | Helton . |
| 5,191,746 | 3/1993 | Russell . |
| 5,533,303 | 7/1996 | Harvey ........................................ 52/16 |
| 5,592,783 | 1/1997 | Jones ........................................... 52/12 |

FOREIGN PATENT DOCUMENTS

| | | | |
|---|---|---|---|
| 1169224 | 6/1984 | Canada ......................................... | 52/16 |
| 0360016 | 8/1989 | European Pat. Off. . | |
| 1370694 | 7/1964 | France ......................................... | 52/11 |
| 819908 | 11/1951 | Germany ..................................... | 52/11 |
| 3344972 | 6/1985 | Germany ..................................... | 52/16 |
| 54-26525 | 2/1979 | Japan . | |
| 54-104021 | 8/1979 | Japan . | |
| 93934 | 5/1959 | Norway ....................................... | 52/11 |
| 2104579 | 3/1983 | United Kingdom . | |
| 2228521 | 8/1990 | United Kingdom ....................... | 52/16 |

*Primary Examiner*—John A. Ricci
*Attorney, Agent, or Firm*—Selitto & Associates

[57] ABSTRACT

A plant watering device includes a collector for temporarily collecting rainwater or the like therein and a mounting mechanism for removably mounting the collector on a roof of a house or the like. The plant watering device also includes a hose, or some other form of fluid conduit, for conveying rainwater or the like from the collector to a remotely located plant.

28 Claims, 2 Drawing Sheets

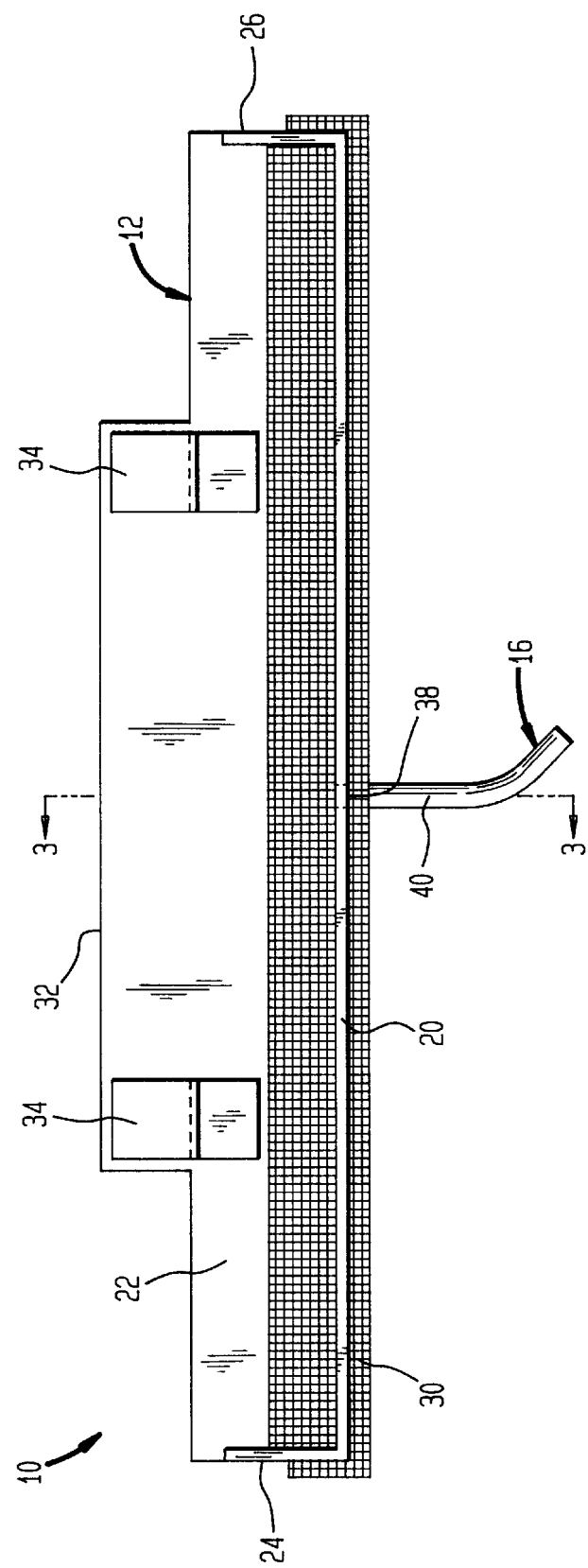

PLANT WATERING DEVICE

FIELD OF THE INVENTION

The present invention relates to plant watering devices and, more particularly, to such devices especially adapted to be removably mounted on a roof of a house or the like to collect water and deliver it to a remotely located plant.

BACKGROUND OF THE INVENTION

Potted plants have been used for decorating the exterior of buildings, such as residential homes, by suspending them from the edge of a roof at the gutter or eaves or by placing them on porches. Regular and efficient watering of such plants is often complicated and time consuming because they are typically remote from a water source and are elevated such that access from the ground is difficult. That is, unless the plant is taken down each time it is to be watered, its elevation makes the plant hard to reach, increasing the likelihood of spills. Bringing water to the potted plant, or moving the plant back and forth to a water source, also increases the likelihood of water spills and consumes considerable time. Additionally, plants suspended under roofs are often beyond the reach of the natural path of rainwater which would otherwise serve to mitigate the inefficiencies of manual watering. Suspended or remotely located plants, therefore, present difficulties with regard to regular and efficient watering.

Various plant watering devices have been developed in the past. For instance, Japanese Patent No. 0104021 relates to a flower pot adapted to be externally mounted on a vertical pipe, such as a discharge pipe extending downwardly from a rain gutter. More particularly, the flower pot includes a rainwater guide sized and shaped so as to be inserted into the pipe through a rainwater outlet formed in the pipe, whereby some rainwater is diverted into the flower pot.

British Patent Publication No. 2 104 579 A relates to a plant watering mechanism having a liquid transmission mechanism, for example, in the form of absorbent braided cotton, for collecting water condensation accumulating on a window sill and conveying the condensate to a potted plant.

U.S. Pat. No. 4,800,675 and European Patent Publication No. 360 016 A relate to plant holders adapted to be mounted on an inclined roof. More particularly, the U.S. Patent discloses a roofing plate equipped with a channel which is sized and shaped so as to receive rainwater when plants are planted therein. The European Patent Publication shows another roof tile design comprising a molded component to hold flower boxes secure on an inclined roof.

U.S. Pat. No. 1,063,395 discloses a self-watering flower pot having a water receptacle, which is mounted above the flower pot. Tubes convey water contained in the receptacle to the flower pot.

U.S. Pat. No. 5,062,239 discloses a mechanism for watering hanging plants located inside buildings. The mechanism is equipped with a collection receptacle, which is suspended from and below the hanging plants for collecting water dripped from the hanging plants, and a drainage tube connected to a lower end of the receptacle. The tube is adapted to drain the water collected in the receptacle to a container, as well as to recirculate such water to the hanging plants through the use of a pump.

U.S. Pat. No. 5,191,746 relates to a window sill extension apparatus for accommodating plants therein. An irrigation mechanism is mounted on the apparatus and includes a perforated pipe extending above the plants for irrigating same. Water is supplied from another source by attaching a hose to a coupling located at one end of the perforated pipe.

While each of the foregoing devices is provided with some form of plant watering mechanism, none of them is adapted for collecting and conveying rainwater to a plant located remotely from a source of water, such as when the plant is suspended under a roof or placed on a porch. As a result, there is a need for a plant watering device adapted for conveying rainwater to a plant remotely located from a water source.

SUMMARY OF THE INVENTION

The present invention overcomes the disadvantages of the prior art described above by providing a new and improved plant watering device adapted to be removably mounted on a roof of a house or a similar building structure. More particularly, the plant watering device includes a collector for temporarily collecting water therein and a mounting mechanism for removably mounting the collector on the roof, whereby the collector can be mounted at many different locations on the roof. The plant watering device also includes a hose for conveying water from the collector to a plant remotely located therefrom. In accordance with one feature of the present invention, the collector is provided with a filter for filtering at least large debris from the water being collected.

BRIEF DESCRIPTION OF THE DRAWINGS

For a more complete understanding of the present invention, reference is made to the following detailed description of an exemplary embodiment considered in conjunction with the accompanying drawings, in which:

FIG. 2 is a top plan view of the plant watering device shown in FIG. 1; and

FIG. 3 is a cross-sectional view, taken along section line 3—3 of FIG. 2 and looking in the direction of the arrows, of the plant watering device shown in FIG. 2.

DETAILED DESCRIPTION OF THE EXEMPLARY EMBODIMENT

Figure 1:
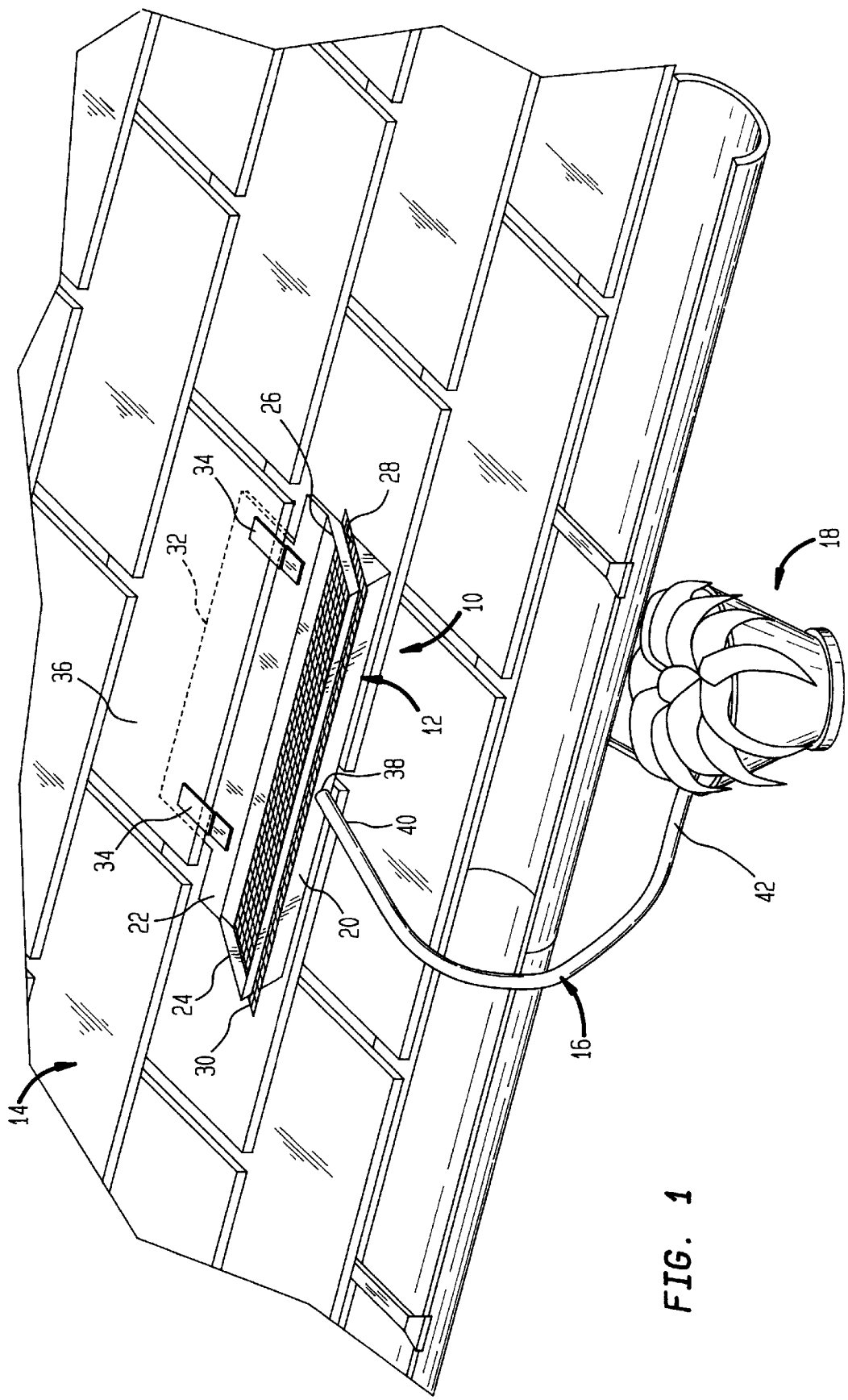
FIG. 1 is a perspective view illustrating the general configuration and use of a plant watering device constructed in accordance with an exemplary embodiment of the present invention.

Referring to FIGS. 1–3, a plant watering device 10 constructed in accordance with the present invention has a trough 12, which is adapted to be removably mounted on a roof 14 of a house or a similar building structure, and a hose 16 connected to the trough 12 for conveying collected rainwater to a remotely located plant 18 (e.g., a plant suspended from the eaves of the roof 14). More particularly, the trough 12 has front and bottom walls 20, 22, respectively, and a pair of side walls 24, 26. The front wall 20, the bottom wall 22 and the side walls 24, 26 cooperate with each other so as to define the trough 12, which is sized and shaped so as to temporarily collect rainwater therein as rainwater flows down the roof 14. The trough 12 also has a slot 28, which is formed in the front wall 20 and the side walls 24, 26, the slot 28 being sized and shaped so as to removably receive a screen 30 for a purpose to be discussed hereinafter.

Still referring to FIGS. 1–3, the trough 12 is provided with a flat tongue 32, which extends from the bottom wall 22, and a pair of tabs 34 mounted on the bottom wall 22 and extending above the tongue 32. More particularly, the tongue 32 is sized and shaped so as to be removably inserted under a roofing shingle 36. In addition, the tongue 32 and the tabs 34 are sized and shaped so as to cooperate with each other to removably receive and releasably grip the shingle 36 therebetween, whereby the trough 12 can be removably and securely mounted on the roof 14.

An outlet 38 is formed in the front wall 20 of the trough 12 for allowing rainwater accumulated in the trough 12 to flow into the hose 16. The hose 16 has a coupling end 40, which is connected to the outlet 38 so as to receive rainwater from the trough 12, and a free end 42 adapted to be positioned about or adjacent to the plant 18, which is positioned below the trough 12.

In use, as rainwater flows down the roof 14, some rainwater accumulates in the trough 12. As rainwater accumulates in the trough 12, the screen 30 filters at least large debris, such as leaves, from the rainwater thereby preventing debris from clogging the outlet 38. The accumulated rainwater then flows through the outlet 38 into the hose 16. Because the coupling end 40 of the hose 16 is positioned at an elevation higher than that of the free end 42 of the hose 16, gravity induces the collected and filtered rainwater to flow through the hose 16 and to be discharged from the free end 42, thereby watering the plant 18 automatically (i.e., without user intervention).

It should be appreciated that the present invention provides numerous advantages over the prior art devices described above. For instance, because the trough 12 is adapted to be removably and securely mounted on the roof 14, it can be mounted at many different locations on the roof 14. As a result, by experimenting with the position of the trough 12 on the roof 14, an optimal position relative to the plant 18 can be determined. In other words, the trough 12 can be selectively mounted on the roof 14. Moreover, the removability of the screen 30 allows for replacement and cleaning as necessary according to the volume and nature of the debris and the durability of the screen 30.

It should be noted that the plant watering device 10 can have many variations and modifications. For instance, the plant watering device 10 can have any open trough shape, e.g., rectangular, cylindrical or any shape similarly capable of retaining rainwater therein. Further, the tongue 32 can have any shape and/or size appropriate for insertion under a roofing shingle, e.g., a semi-circular shape or a tongue as wide as the trough 12. Additionally, the trough 12 can be in the form of a plurality of extensions instead of a single tongue as illustrated in FIG. 1–3. Moreover, the tabs 34 can be replaced by a variety of other mechanisms (e.g., flexible clips or spring-loaded clips) for securing or fastening the trough 12 on the roof 14. In addition, one or both of the tabs 34 and/or the tongue 32 can be eliminated. In such circumstances, the trough 12 can be secured to the roof 14 by any conventional mechanism, such as hooks.

The walls 20, 22, 24, 26 of the trough 12, the tongue 32 and the tabs 34 can be formed separately and affixed to one another by various means such as gluing or nailing, or they may be molded as a single unitary body. Rigid, durable materials, such as wood or plastic, can be used. The screen 30 can be a mesh of plastic, wire or other similar material and of a size and durability appropriate for catching and retaining debris typically found on roofs of buildings.

The hose 16 is preferably made of a flexible material, such as rubber or vinyl, such that the hose 16 is capable of conveying water around various obstacles such as gutters and railings. Further, the plant watering device 10 can be modified to simultaneously convey rainwater to a plurality of plants by using a manifold outlet or splitter which is adapted to accommodate a plurality of hoses.

While the plant watering device 10 has been described hereinabove as being adapted to automatically water a remotely located plant with rainwater, it can be used to collect and distribute water emanating from other sources. For instance, in periods of drought, a user can spray the area of the roof 14 above the trough 12 with faucet water by using a conventional spray hose. In such circumstances, some of the sprayed water accumulates in the trough 12 and is then conveyed to the plant. In addition, water containing fertilizers can be sprayed in a similar manner.

It will be understood that the embodiment described herein is merely exemplary and that a person skilled in the art may make many variations and modifications without departing from the spirit and scope of the invention. All such variations and modifications are intended to be included within the scope of the invention as defined in the appended claims.

I claim:

1. A plant watering device adapted to be removably mounted on a roof, comprising collecting means for temporarily collecting water therein as water flows down a roof; conveying means for conveying collected water from said collecting means to a plant located remotely from said collecting means; and mounting means for removably mounting said collecting means to a roofing shingle such that said collecting means can be selectively mounted at many different locations on a roof between an upper edge thereof and a lower edge thereof.

2. The plant watering device of claim 1, further comprising filtering means, mounted to said collecting means, for filtering at least large debris from water as water accumulates in said collecting means.

3. The plant watering device of claim 2, wherein said collecting means includes a trough sized and shaped so as to temporarily collect water therein as water flows down the roof.

4. The plant watering device of claim 3, wherein said mounting means includes an extension projecting from said trough and sized and shaped so as to be inserted under a roofing shingle for removably mounting said trough on the roof.

5. The plant watering device of claim 4, wherein said mounting means further includes a tab extending from said trough, said tab and said extension cooperating with each other so as to removably receive and releasably grip a roofing shingle therebetween, whereby said trough can be removably and securely mounted on a roof.

6. The plant watering device of claim 5, wherein said trough includes a slot formed therein; and wherein said filtering means includes a screen removably received in said slot.

7. The plant watering device of claim 6, wherein said conveying means includes a flexible hose for conveying water collected in said trough to a remotely located plant.

8. The plant watering device of claim 7, wherein said hose has a first end, which is connected to a constantly open outlet formed in said trough, for receiving collected water from said trough, and a second end sized and shaped so as to be positioned adjacent a remotely located plant, whereby water can flow automatically from said trough to a plant.

9. The plant watering device of claim 8, wherein said mounting means further includes another tab extending from said trough, said another tab and said extension cooperating with each other so as to removably receive and releasably grip a roofing shingle therebetween, whereby said trough can be removably and securely mounted on a roof.

10. The plant watering device of claim 3, wherein said trough includes a slot formed therein; and wherein said filtering means includes a screen removably received in said slot.

11. The plant watering device of claim 1, wherein said collecting means includes a trough sized and shaped so as to temporarily collect water therein as water flows down a roof.

12. The plant watering device of claim 11, wherein said mounting means includes an extension projecting from said trough and sized and shaped so as to be inserted under a roofing shingle for removably mounting said trough on a roof.

13. The plant watering device of claim 12, wherein said mounting means further includes a tab extending from said trough, said tab and said extension cooperating with each other so as to removably receive and releasably grip a roofing shingle therebetween, whereby said trough can be removably and securely mounted on a roof.

14. The plant watering device of claim 13, wherein said mounting means further includes another tab extending from said trough, said another tab and said extension cooperating with each other so as to removably receive and releasably grip a roofing shingle therebetween, whereby said trough can be removably and securely mounted on a roof.

15. The plant watering device of claim 1, wherein said collecting means is positioned above a gutter located adjacent a lower edge of a roof; and wherein said conveying means includes a flexible hose for conveying water collected in said collecting means to an underlying plant, said hose being of sufficient length to extend over a gutter to an underlying plant.

16. The plant watering device of claim 1, wherein said collecting means can be selectively mounted at many different locations on a roof between a left edge thereof and a right edge thereof.

17. The plant watering device of claim 1, wherein said collecting means includes a trough sized and shaped so as to collect water therein as water flows down a roof, said trough having one end defined by a front wall, another end opposite said one end which is open, a bottom defined by a bottom wall, an open top, and a pair of side walls cooperating with said front wall and bottom wall so as to delimit said trough.

18. A plant watering device adapted to be removably mounted on a roof, comprising collecting means for collecting water therein, said collecting means including a trough sized and shaped so as to temporarily collect water therein as water flows down a roof; filtering means, mounted to said collecting means, for filtering at least large debris from water as water accumulates in said collecting means; conveying means for conveying collected water from said collecting means to a plant located remotely from said collecting means; and mounting means for removably mounting said collecting means on a roof, said mounting means including an extension projecting from said trough and sized and shaped so as to be inserted under a roofing shingle and a tab extending from said trough, said tab and said extension cooperating with each other so as to removably receive and releasably grip a roofing shingle therebetween, whereby said trough can be removably, securely, and selectively mounted at many different locations on a roof.

19. The plant watering device of claim 18, wherein said trough includes a slot therein; and wherein said filtering means includes a screen removably received in said slot.

20. The plant watering device of claim 19, wherein said conveying means includes a flexible hose for conveying water collected in said trough to a remotely located plant.

21. The plant watering device of claim 20, wherein said hose has a first end, which is connected to an outlet formed in said trough, for receiving collected water from said trough, and a second end sized and shaped so as to be positioned adjacent a remotely located plant.

22. The plant watering device of claim 21, wherein said mounting means further includes another tab extending from said trough, said another tab and said extension cooperating with each other so as to removably receive and releasably grip a roofing shingle therebetween, whereby said trough can be removably and securely mounted on a roof.

23. A plant watering device adapted to be removably mounted on a roof, comprising collecting means for collecting water therein, said collecting means including a trough sized and shaped so as to temporarily collect water therein as water flows down a roof, said trough also including a slot formed therein; filtering means, mounted to said collecting means, for filtering at least large debris from water as water accumulates in said collecting means, said filtering means including a screen removably received in said slot; conveying means for conveying collected water from said collecting means to a plant located remotely from said collecting means; and mounting means for removably mounting said collecting means on a roof, whereby said collecting means can be selectively mounted at many different locations on a roof.

24. The plant watering device of claim 23, wherein said trough has one end defined by a front wall, another end opposite said one end which is open, a bottom defined by a bottom wall, an open top, and a pair of side walls cooperating with said front wall and said bottom wall so as to delimit said trough; and wherein said slot is formed in said front wall and said side walls, said slot being sized and shaped so as to removably receive said screen.

25. A plant watering device adapted to be removably mounted on a roof, comprising collecting means for collecting water therein, said collecting means including a trough sized and shaped so as to temporarily collect water therein as water flows down a roof; conveying means for conveying collected water from said collecting means to a plant located remotely from said collecting means; and mounting means for removably mounting said collecting means on a roof, said mounting means including an extension projecting from said trough and sized and shaped so as to be inserted under a roofing shingle and a tab extending from said trough, said tab and said extension cooperating with each other so as to removably receive and releasably grip a roofing shingle therebetween, whereby said trough can be removably, securely, and selectively mounted at many different locations on a roof.

26. The plant watering device of claim 25, wherein said mounting means further includes another tab extending from said trough, said another tab and said extension cooperating with each other so as to removably receive and releasably grip a roofing shingle therebetween, whereby said trough can be removably and securely mounted on a roof.

27. The plant watering device of claim 26, wherein said conveying means includes a flexible hose for conveying water collected in said trough to a remotely located plant.

28. The plant watering device of claim 27, wherein said hose has a first end, which is connected to an outlet formed in said trough, for receiving collected water from said trough, and a second end sized and shaped so as to be positioned adjacent a remotely located plant.

* * * * *